June 16, 1925. 1,542,115
A. O. WEIS
FOOD STORING DISHES
Filed Oct. 25, 1924 2 Sheets-Sheet 1
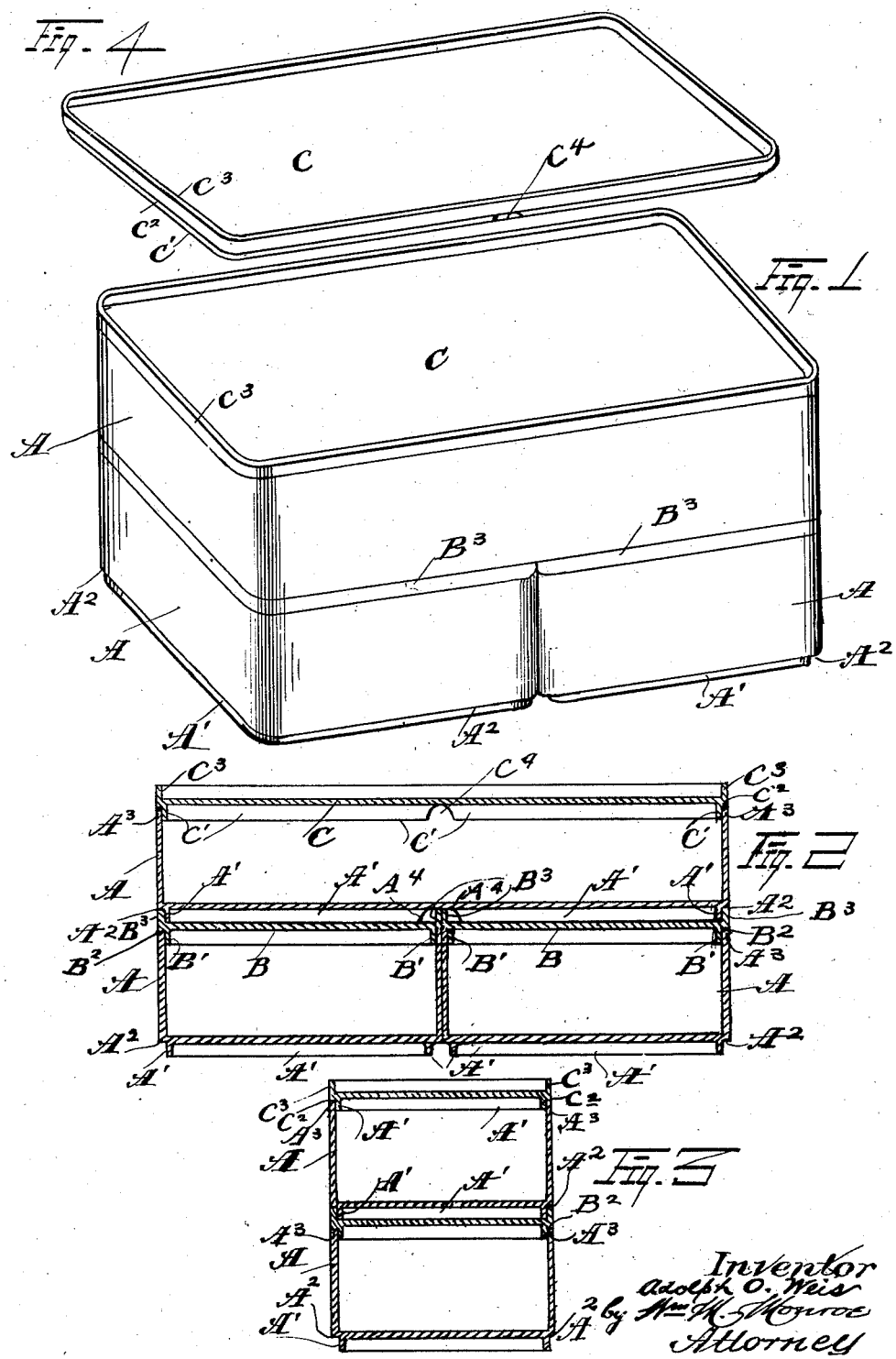

June 16, 1925.  
A. O. WEIS  
1,542,115  
FOOD STORING DISHES  
Filed Oct. 25, 1924     2 Sheets-Sheet 2
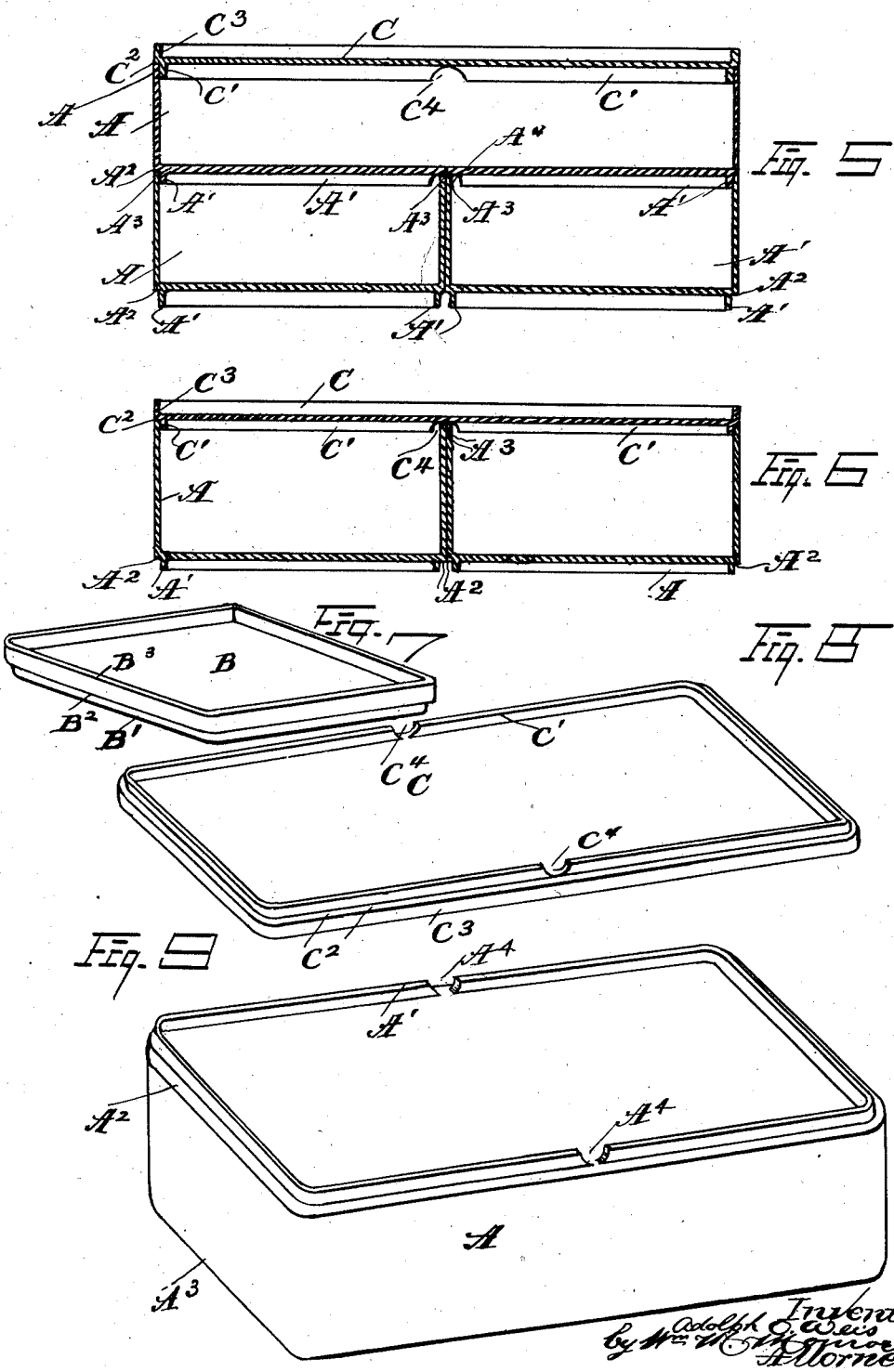

Patented June 16, 1925.

1,542,115

UNITED STATES PATENT OFFICE.

ADOLPH O. WEIS, OF CLEVELAND, OHIO.

FOOD-STORING DISHES.

Application filed October 25, 1924. Serial No. 745,836.

*To all whom it may concern:*

Be it known that I, ADOLPH O. WEIS, a citizen of the United States, and resident of Cleveland, in the county of Cuyahoga and State of Ohio, have invented certain new and useful Improvements in Food-Storing Dishes, of which I hereby declare the following to be a full, clear, and exact description, such as will enable others skilled in the art to which it appertains to make and use the same.

The objects of the invention are to provide an improved dish and method of constructing the same which permits them to be used singly or to be stacked one upon the other in such a manner as to conserve the amount of space occupied thereby, and also to be capable of nesting with each other in units or stacks composed of small dishes and dishes of multiple sizes thereof, in which the larger dishes may be superimposed upon the smaller dishes or the smaller dishes upon the larger dishes at the convenience of the user. In this manner the dishes can be stored in cupboards, refrigerators or ovens in a compact form, and a large number of dishes can be made to occupy a very limited amount of space therein.

Also, the dishes are so constructed as to make air-tight joints with each other, so that no odors from cooking or from odorous materials will be communicated to the contents of other dishes. For instance, it is well known that some foods such as butter or milk will readily absorb the odor of leeks, onions or fried fish, and ordinarily such absorbent foods can not be stored in the same receptacle or refrigerator with other foods having a strong odor without being contaminated thereby.

The dishes may be made of heat resisting material so that they may be enclosed in an oven and a number of food dishes may be cooked at the same time, thus greatly assisting the chef in the preparation of the meal. Also each dish may be provided with a separate cover, or the dishes may be stacked without covers, at the option of the user, and will be air tight.

To accomplish this result the dishes are formed with a depending flange on the lower surface which will extend into the opening at the top of a dish below when one dish is placed upon another and are also provided with a marginal shoulder which rests upon the upper edge of the dish below and hence makes the joint air tight.

Also, each cover is provided with a depending flange that enters the top of the dish below, and with a similar shoulder that rests upon the upper edge of said lower dish. Also upon the upper side of each cover a marginal flange is provided that engages with the shoulder upon the lower edge of the dish above when the dishes are nested together.

Also, provision is made to enable a large dish to rest closely upon a multiple number of smaller dishes, thus making the dishes interchangeable at will.

The invention is hereinafter more fully described, illustrated in the accompanying drawings and specifically pointed out in the claims.

In the accompanying drawings Fig. 1 is a perspective illustrating a large dish superimposed upon two smaller dishes and each dish provided with a separate cover. Fig. 2 is a vertical longitudinal section thereof. Fig. 3 is a transverse section thereof. Fig 4 is a top view of the cover of the larger dish. Fig. 5 is a longitudinal section of a similar stack omitting the covers for the smaller dishes. Fig. 6 is a similar section illustrating the use of one large cover to cover two small dishes. Fig. 7 is a perspective of the top of one of the smaller dishes. Fig. 8 is a bottom view of one of the top covers. Fig. 9 is a bottom view of one of the large dishes showing longitudinal flanges thereon cut away centrally to permit the dish to be superimposed upon two smaller dishes.

In these figures A represents a rectangular dish provided with a depending flange $A^1$ on its bottom wall spaced from the edge on all sides to provide a shoulder $A^2$. This structure is common to dishes of all sizes. The covers B for the small dishes are flat plates provided with similar depending flanges $B^1$ on the lower surface and with similar marginal shoulders, $B^2$ to rest upon the upper edges $A^3$ of the dishes. They are also provided with marginal vertical flanges $B^3$. The covers C for the larger dishes are provided with similar depending flanges $C^1$ and marginal shoulders $C^2$ and with marginal vertical flanges $C^3$ which rest against the shoulders $A^2$ of the dishes above.

To enable these covers to be placed upon the upper edges of two smaller dishes the longitudinal lower flanges $C^1 C^1$ are cut out at $C^4 C^4$ so as to enable them to overlap the adjoining upper edges $A^3 A^3$ of the smaller dishes, as shown clearly in Fig. 5 and Fig. 6.

Also, to permit a large dish to be placed over two smaller dishes as shown in Fig. 5 or over two smaller covers as shown in Fig. 2, the lower longitudinal flanges $A^1 A^1$ are cut away at $A^4 A^4$ to enable the bottom of the dish to overlap either the upper edges $A^3$ of the smaller dishes or the edges of the vertical flanges $B^3 B^3$ of the smaller covers. In this manner the dishes and covers can be interchangeably stacked in any manner of arrangement desired.

Having described the invention what I claim as new and desire to secure by Letters Patent is:

1. The combination with an elongated dish, of a multiple number of smaller dishes upon which said larger dish is superimposed, said larger dish being provided with depending transverse and longitudinal flanges upon its bottom wall, and with a marginal shoulder, said shoulder being engageable with the upper edges of said smaller dishes, said longitudinal flanges being cut away to permit the bottom of said larger dish to overlap the adjacent upper edges of said smaller dishes.

2. The combination with a multiple number of dishes of a common cover therefor, said cover being provided with a marginal shoulder at its lower edges and also being provided with marginal depending transverse and longitudinal flanges, said longitudinal flanges being cut away intermediate of their ends to permit said cover to overlap the adjoining top edges of said smaller dishes.

3. The combination with a multiple number of dishes of a common cover therefor, said cover being provided with a marginal shoulder at its lower edges and also being provided with marginal depending transverse and longitudinal flanges, said longitudinal flanges being cut away intermediate of their ends to permit said cover to overlap the adjoining top edges of said smaller dishes, said cover being also provided with a vertical marginal flange encircling its upper edges.

In testimony whereof, I hereunto set my hand this 22" day of October, 1924.

ADOLPH O. WEIS.

In presence of—
WM. M. MONROE.